W. R. BAGWELL.
TIRE TIGHTENER.
APPLICATION FILED DEC. 31, 1910.
1,051,187.
Patented Jan. 21, 1913.
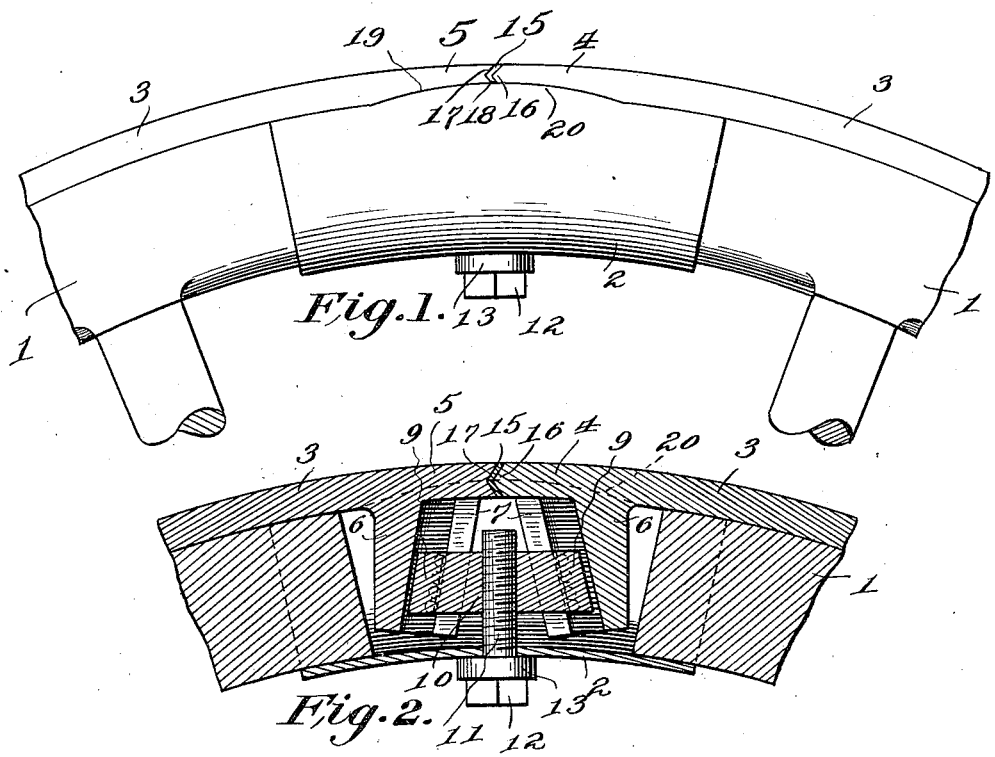
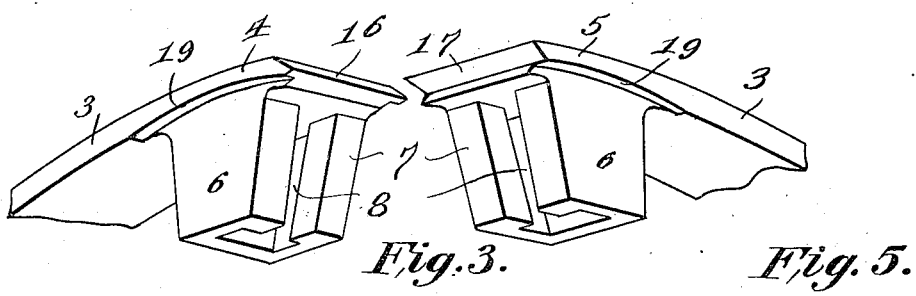
Inventor
William R. Bagwell
Witnesses
By Victor J. Evans
Attorney

UNITED STATES PATENT OFFICE.

WILLIAM R. BAGWELL, OF TUSCALOOSA, ALABAMA.

TIRE-TIGHTENER.

1,051,187.

Specification of Letters Patent. Patented Jan. 21, 1913.

Application filed December 31, 1910. Serial No. 600,325.

*To all whom it may concern:*

Be it known that I, WILLIAM R. BAGWELL, a citizen of the United States, residing at Tuscaloosa, in the county of Tuscaloosa and State of Alabama, have invented new and useful Improvements in Tire-Tighteners, of which the following is a specification.

This invention relates to tire tighteners and the object of the invention is the provision of a simple, efficient and durable device for shrinking a tire upon the felly in proportion to the shrinkage of the wheel and in such a manner as to avoid dishing the wheel.

A further object of the invention is the provision of a device of this character which may be readily operated with the use of a single tool, such as a monkey wrench or the like, whereby the tire may be readily adjusted upon the road without the aid of a blacksmith or skilled mechanic.

Further objects of the invention will appear as the following specific description is read in connection with the accompanying drawing, which forms a part of this application, and in which:—

Figure 1 is a detailed side elevation of a portion of a wheel showing my improved shrinking mechanism applied thereto. Fig. 2 is a longitudinal section taken vertically through Fig. 1. Fig. 3 is a perspective view of the separated tire ends. Fig. 4 is a similar view of the shrinking head. Fig. 5 is a perspective view of one of the filling blocks.

Referring more particularly to the drawing, 1 represents a wheel felly which has its ends separated and secured together by a U iron 2 whose upper edges are flush with the top of the felly throughout the majority of their length. The tire is shown at 3 as the ordinary buggy tire, but it must be understood that any type of tire may be shrunk in the manner to be hereinafter described. The ends 4 and 5 of the tire are provided with laterally extending lugs 6 whose adjoining faces are beveled off, as at 7, and provided with undercut grooves 8 adapted to receive the T heads 9 upon the shrinking block 10. The faces 7 and the grooves 8 of the lugs 6 diverge from each other and the heads 9 on the block 10 are so inclined that when the block is pulled away from the tire proper it will draw the ends of the tire together, as will be hereinafter described. The lugs 6 and the shrinking block 10 seat within the U iron which is provided with a central aperture in its under side to receive an operating screw 11 having a squared end 12 for the reception of a wrench and an annular collar 13 to bear upon the U iron so that when the screw is threaded into the centrally threaded aperture 14 of the block 10, the same will be drawn inwardly toward the center of the wheel and the heads 9 will act, in connection with the diverging grooves, to draw the ends of the tire together.

In placing the tire upon a wheel, for the first time, it is found advantageous to make the tire somewhat smaller than the felly so that as the wheel shrinks the tire may be taken up without cutting off portions of the meeting ends, and in order to fill the space between the meeting ends when the tire is first applied, suitable shims 15 are employed which are substantially V-shaped in cross section to mate with the projecting V end 16 of the end 4 and with the V-shaped socket 17 of the end 5. These shims have one leg cut away at both ends, as shown at 18, so as to enter between the sides of the U iron 2, and the ends of the tires are also preferably cut away, as at 19, and the cut away portion filled by arc-shaped projections 20 on the side of the U iron. These projections, entering the cut away portions 19, prevent lateral movement of the tire in the U iron and therefore hold the same true with the felly.

In the operation of applying the device, the heads of the shrinking block are inserted in the grooves prior to the adjustment of the tire to the felly. The tire is then placed upon a wheel and the screw 11 inserted through the aperture in the bottom of the U iron and threaded into the aperture 14, so as to draw the head away from the tire and thereby cause the coacting parts to draw the ends of the tire together. If the tire ends will not meet the screw is loosened and a suitable number of shims 15 are placed between the ends and the screw operated to draw the ends together as before described. As these shims conform to the ends of the tire and also are engaged by the sides of the U iron they are absolutely prevented from displacement when the tire ends are pulled together.

Having thus described the invention, what I claim as new is:—

A device of the class described comprising, in combination with a felly having separated ends, a U iron secured to the felly and covering the space between the separated ends, a tire having separated ends, diverging lugs carried by said ends and having undercut grooves therein, a shrinking block having diverging heads to engage the undercut grooves, a screw passing through the U iron and threaded into the shrinking head to draw the same away from the tire and thereby draw ends of the tire together.

In testimony whereof I affix my signature in presence of two witnesses.

WILLIAM R. BAGWELL.

Witnesses:
W. H. JOHNSON,
C. C. KILGORE.

Copies of this patent may be obtained for five cents each, by addressing the "Commissioner of Patents, Washington, D. C."